United States Patent
Nagata et al.

(10) Patent No.: US 9,916,754 B2
(45) Date of Patent: Mar. 13, 2018

(54) PROXIMITY-BASED VEHICLE LOCATION ALERTS

(71) Applicant: Toyota Motor Engineering & Manufacturing North America, Inc., Erlanger, KY (US)

(72) Inventors: Katsumi Nagata, Foster City, CA (US); Yuichi Ochiai, Cupertino, CA (US); Hiroaki Kimura, Cupertino, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 186 days.

(21) Appl. No.: 14/673,668

(22) Filed: Mar. 30, 2015

(65) Prior Publication Data
US 2016/0293008 A1 Oct. 6, 2016

(51) Int. Cl.
| | |
|---|---|
| G08G 1/123 | (2006.01) |
| G08G 1/005 | (2006.01) |
| G08G 1/00 | (2006.01) |
| H04W 4/02 | (2018.01) |
| H04W 4/00 | (2018.01) |

(52) U.S. Cl.
CPC ............. *G08G 1/005* (2013.01); *G08G 1/205* (2013.01); *G08G 1/207* (2013.01); *H04W 4/02* (2013.01); *H04W 4/008* (2013.01)

(58) Field of Classification Search
CPC .............................. G08G 1/123; G08G 1/005
USPC .............. 340/457, 988, 989, 539.11, 539.13, 340/426.36
See application file for complete search history.

(56) References Cited

U.S. PATENT DOCUMENTS

| | | | |
|---|---|---|---|
| 6,323,566 B1 * | 11/2001 | Meier | G07C 9/00309 |
| | | | 180/287 |
| 6,407,698 B1 | 6/2002 | Ayed | |
| 6,611,742 B1 | 8/2003 | Sand et al. | |
| 6,791,477 B2 | 9/2004 | Sari et al. | |
| 7,502,687 B2 | 3/2009 | Flick | |
| 7,663,502 B2 | 2/2010 | Breed | |
| 7,850,078 B2 | 12/2010 | Christenson et al. | |

(Continued)

FOREIGN PATENT DOCUMENTS

| | | |
|---|---|---|
| JP | 2005127050 A | 5/2005 |
| WO | 2012103394 A1 | 8/2012 |

*Primary Examiner* — Brent Swarthout
(74) *Attorney, Agent, or Firm* — Christopher G. Darrow; Darrow Mustafa PC

(57) ABSTRACT

Arrangements related to proximity-based vehicle location alerts are described. A vehicle can include a location signaling mode. In the location signaling mode, an alert is automatically provided by the vehicle responsive to detecting an authorized portable communication device being located within a predetermined alert distance from the vehicle. In the way, an indication of the location of the vehicle is provided to a user of the portable communication device. However, responsive to determining that the vehicle is located in a predetermined special location, the location signaling mode can be altered in one or more respects. In one or more arrangements, altering the location signaling mode can include disabling the location signaling mode. Thus, an indication of the location of the vehicle is not provided responsive to detecting that the portable device is located within the predetermined alert distance from the vehicle.

18 Claims, 4 Drawing Sheets

(56) References Cited

U.S. PATENT DOCUMENTS

| | | |
|---|---|---|
| 8,224,313 B2 | 7/2012 | Howarter et al. |
| 8,644,843 B2 | 2/2014 | Canon et al. |
| 8,818,725 B2 | 8/2014 | Ricci |
| 2002/0101366 A1 | 8/2002 | Flick |
| 2009/0146846 A1* | 6/2009 | Grossman ............... B60R 25/04 340/988 |
| 2010/0114488 A1* | 5/2010 | Khamharn ............ B60R 25/102 701/300 |
| 2010/0211307 A1 | 8/2010 | Geelen |
| 2014/0232569 A1 | 8/2014 | Skinder et al. |
| 2014/0256258 A1* | 9/2014 | DeLuca ................ H04W 4/008 455/41.2 |
| 2014/0361904 A1* | 12/2014 | Gaboury ................. G08B 3/10 340/692 |
| 2015/0048927 A1* | 2/2015 | Simmons ........... G07C 9/00309 340/5.61 |

\* cited by examiner

400

Determining whether the vehicle is located in a predetermined special location

410

Responsive to determining that the vehicle is located in a predetermined special location, altering the location signaling mode

PROXIMITY-BASED VEHICLE LOCATION ALERTS

FIELD

Arrangements relate in general to vehicles and, more particularly, to assistance in locating a vehicle.

BACKGROUND

Remote keyless entry (RKE) systems have become commonly used in automobiles. An RKE system includes a device (e.g. a fob) that can allow a user to remotely perform some of the functions of a standard automobile key without physically contacting the vehicle. For example, the user can press a respective button on the RKE device to remotely lock or unlock the doors of the automobile. In some instances, temporary audible and/or visual indicators can accompany the locking and unlocking of the doors to inform a driver that the desired action has been performed. Such indicators can also assist a driver in locating his or her vehicle, particularly in large parking lots where a driver may forget the location of his or her vehicle and/or may become confused due to the presence of numerous similar-looking vehicles. Due to the limited range of the RKE system, a user may have to press the appropriate button on the RKE device numerous times while walking in close proximity to his or her vehicle to ultimately locate it. Some RKE devices also include a panic button that activates a car alarm when pressed by a user.

SUMMARY

In one respect, the subject matter described herein is directed to a proximity-based location alert method for a vehicle. The vehicle can include a location signaling mode. In such mode, an audial alert and/or a visual alert can be automatically provided responsive to detecting an authorized portable communication device being located within a predetermined alert distance from the vehicle. In this way, an indication of the location of the vehicle is provided to a user of the portable communication device. The method can include determining whether the vehicle is located in a predetermined special location. The method can also include, responsive to determining that the vehicle is located in a predetermined special location, altering the location signaling mode.

In another respect, the subject matter described herein is directed to a proximity-based location alert system for a vehicle. The system can include a vehicle. The vehicle can include a location signaling mode. In the location signaling mode, an audial alert and/or a visual alert can be automatically provided responsive to detecting an authorized portable communication device being located within a predetermined alert distance from the vehicle. Thus, an indication of the location of the vehicle can be provided to a user of the portable communication device.

The vehicle can include a processor. The processor can be configured to determine whether the vehicle is located in a predetermined special location. The processor can be further configured to, responsive to determining that the vehicle is located in a predetermined special location, alter the location signaling mode.

BRIEF DESCRIPTION OF THE DRAWINGS

FIG. 4 is an example of a proximity-based location alert method for a vehicle.

DETAILED DESCRIPTION

Figure 1:
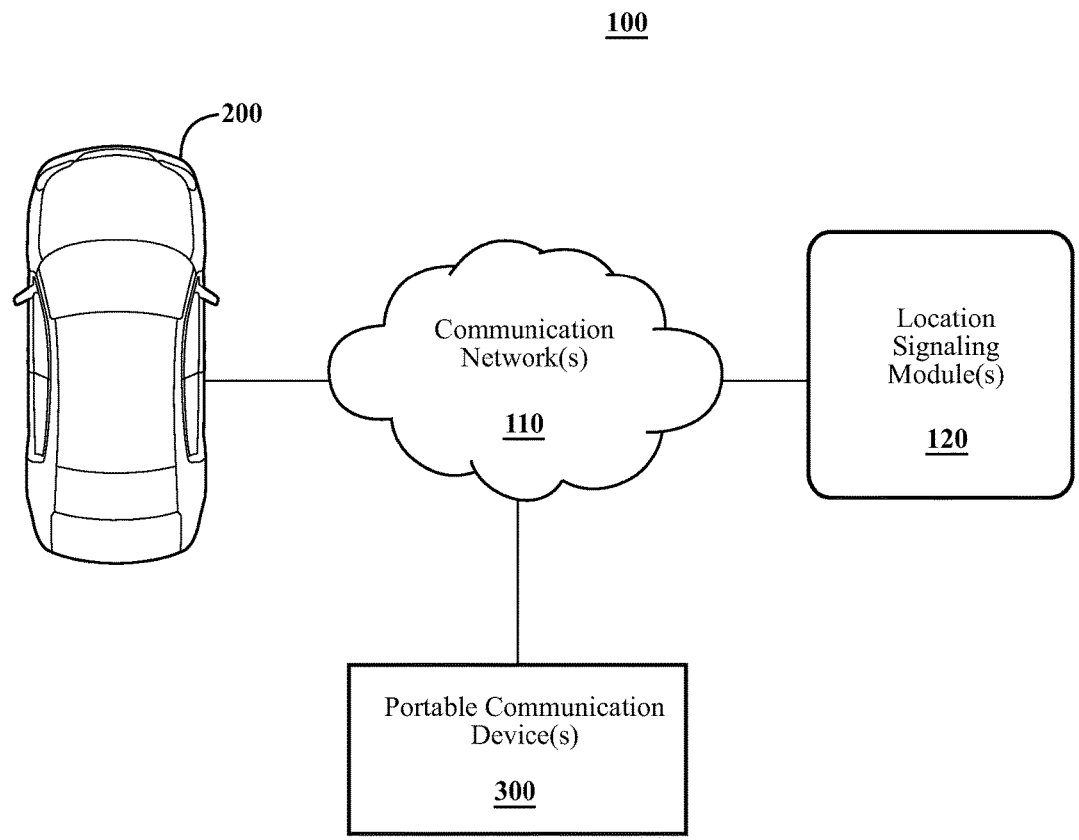
FIG. 1 is an example of a proximity-based location alert system for a vehicle.

This detailed description generally relates to locating a vehicle using proximity-based alerts. A vehicle can include a location signaling mode in which an audial alert and/or a visual alert can be automatically provided responsive to detecting an authorized portablecommunication device being located within a predetermined alert distance from the vehicle. In this way an indication of the location of the vehicle can be provided to a user of the portable communication device. However, according to arrangements described herein, the location signaling mode can be altered in one or more respects if the vehicle is determined to be located in a predetermined special location. The present detailed description relates to systems, devices, methods and computer program products that incorporate such features. In at least some instances, such systems, devices, methods and computer program products can assist a user in locating his or her vehicle without any action by the user. Further, such systems, devices, methods and computer program products can minimize annoyances or disturbances when the vehicle is located in a place where the user will not have trouble in locating the vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a system 100 for proximity-based location alerts for a vehicle. The system 100 can include a vehicle 200 and one or more portable communication devices 300. The system 100 can include a location signaling module 120. Each of these elements of the system 100 will be described in turn below.

As used herein, "vehicle" means any form of motorized transport. In one or more implementations, the vehicle 200 can be an automobile. While arrangements will be described herein with respect to automobiles, it will be understood that embodiments are not limited to automobiles. In one or more implementations, the vehicle 200 may be a watercraft, an aircraft or any other form of motorized transport.

The portable communication device 300 can be any suitable device including, for example, a cellular telephone, a smart phone, a personal digital assistant ("PDA"), a tablet computer, a digital reader, a handheld device having wireless connection capability, a computer (e.g., a laptop), a portable computing device, an entertainment device (e.g., an audio or video device). The portable communication device 300 can be configured to communicate via a wireless medium. The portable communication device 300 can include any suitable operating system.

In one or more arrangements, the portable communication device 300 can be configured so as to be wearable by a user. For instance, the portable communication device 300 can be a smart watch, smart eye glasses, smart jewelry (e.g., neckless, earrings, bracelets, etc.), and/or smart clothing (e.g., a shirt, hat or other article of clothing enabled for wireless communication).

The location signaling module 120 can be implemented as computer readable program code that, when executed by a processor, implement one or more of the various processes described herein. The location signaling module 120 can be a component of one or more processors, or the location signaling module 120 can be executed on and/or distributed among other processing systems to which a processor is operatively connected.

The location signaling module 120 can include instructions (e.g., program logic) executable by a processor. Such instructions can include instructions to execute various vehicle functions and/or to transmit data to, receive data from, interact with, and/or control the vehicle 200, one or more systems of the vehicle 200, the portable communication device(s) 300, and/or one or more systems of the portable communication device(s) 300. Such instructions can enable the vehicle 200 to communicate with the portable communication device 300 through the communication network 110. Such instructions can include instructions to activate, deactivate or alter a location signaling mode. Alternatively or in addition, one or more data stores may contain such instructions.

The various components of system 100 can be communicatively linked through one or more communication networks 110. As used herein, the term "communicatively linked" can include direct or indirect connections through a communication channel or pathway or another component or system. A "communication network" means one or more components designed to transmit and/or receive information from one source to another.

The one or more communication networks 110 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 110 further can be implemented as or include one or more wireless networks, whether short or long range. For example, in terms of short range wireless networks, the communication network 110 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 110 can include a mobile, cellular, and or satellite-based wireless network and support voice, video, text, and/or any combination thereof. Examples of long range wireless networks can include GSM, TDMA, CDMA, WCDMA networks or the like. The communication network 110 can include wired communication links and/or wireless communication links. The communication network 110 can include any combination of the above networks and/or other types of networks. The communication network 110 can include one or more routers, switches, access points, wireless access points, and/or the like.

The vehicle 200 and/or the portable communication device(s) 300 can include and/or execute suitable communication software, which enables the vehicle 200 and/or the portable communication device(s) 300 to communicate with each other through the communication network 110 and perform the functions disclosed herein.

Figure 2:
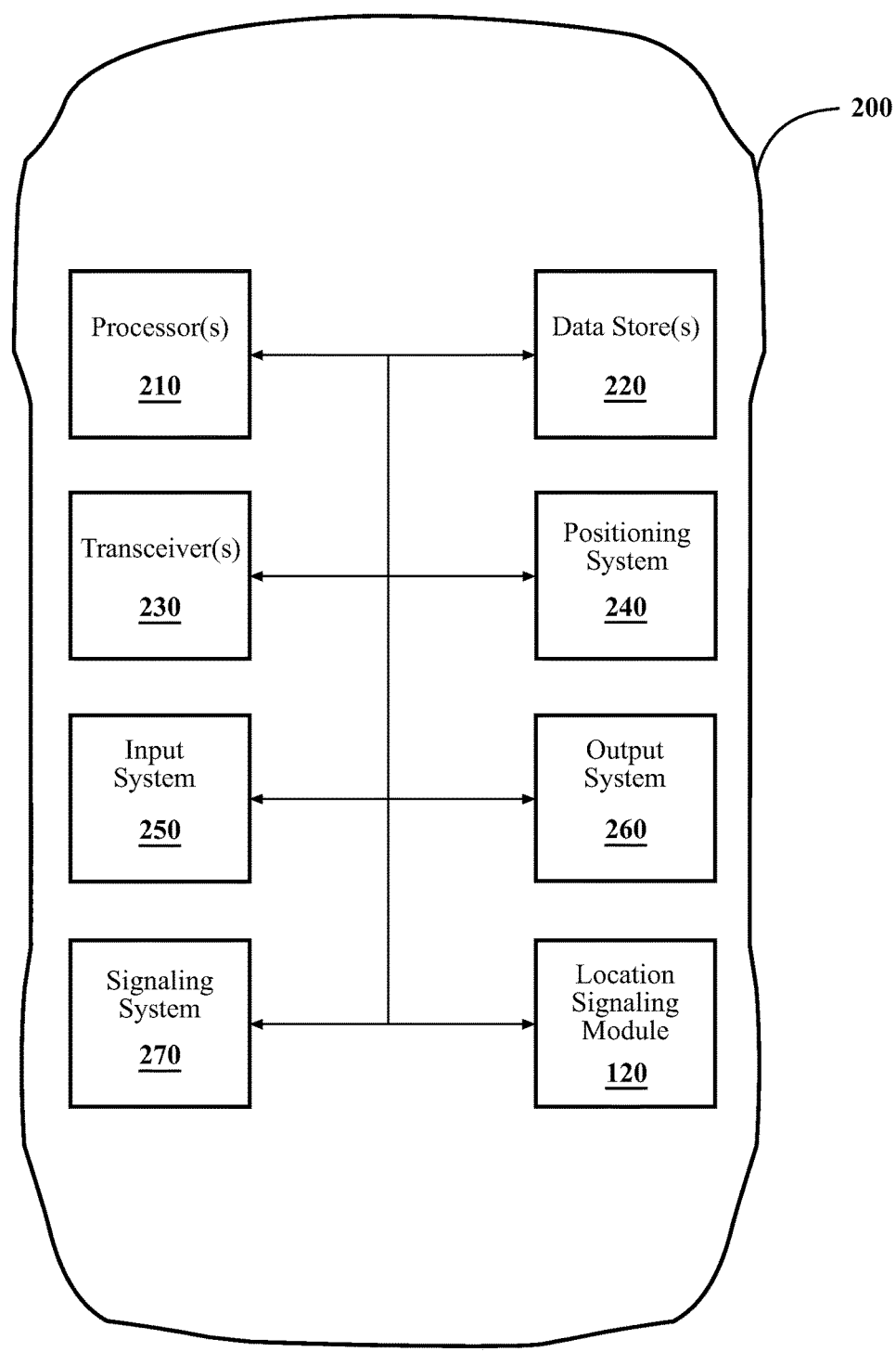
FIG. 2 is an example of a vehicle configured for proximity-based location alerts.

Referring to FIG. 2, an example a vehicle 200 is shown. The vehicle 200 can be configured to provide proximity-based location alerts as described herein. The vehicle 200 can include various elements. Some of the possible elements of the vehicle 200 are shown in FIG. 2 and will now be described. It will be understood that it is not necessary for the vehicle 200 to have all of the elements shown in FIG. 2 or described herein. The vehicle 200 can have any combination of the various elements shown in FIG. 2. Further, the vehicle 200 can have additional elements to those shown in FIG. 2. In some arrangements, vehicle 200 may not include one or more of the elements shown in FIG. 2.

Further, the various elements are shown as being located within the vehicle 200 in FIG. 2, but it will be understood that one or more of these elements can be located external to the vehicle 200. Further, the elements shown may be physically separated by large distances. It should be appreciated that although particular elements are separately defined, each or any of the elements or portions thereof may be otherwise combined or segregated via hardware and/or software.

The vehicle 200 can include one or more processors 210. As used herein, "processor" means any component or group of components that are configured to execute any of the processes described herein or any form of instructions to carry out such processes or cause such processes to be performed. The processor 210 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 210 can include at least one hardware circuit (e.g., an integrated circuit) configured to carry out instructions contained in program code.

In arrangements in which there is a plurality of processors 210, such processors 210 can work independently from each other or one or more processors can work in combination with each other. In one or more arrangements, the processor 210 can be a main processor of the vehicle 200. For instance, the processor 210 can be an engine control unit.

The vehicle 200 can include one or more data stores 220 for storing one or more types of data. The one or more data stores 220 can include volatile and/or non-volatile memory. Examples of suitable data stores 220 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The one or more data stores 220 can be operatively connected to the processor 210 for use thereby.

The term "operatively connected," as used throughout this description, can include direct or indirect connections, including connections without direct physical contact.

The vehicle 200 can include one or more transceivers 230. As used herein, "transceiver" is defined as a component or a group of components that transmit signals, receive signals or transmit and receive signals, whether wirelessly or through a hard-wired connection. The one or more transceivers 230 can be operatively connected to the one or more processors 210 and/or the one or more data stored 220.

The one or more transceivers 230 can enable communications between the vehicle 200 and the one or more portable communication devices 300. The one or more transceivers 230 can be any suitable transceivers used to access a network, access point, node or other device (e.g., the one or more portable communication devices 300) for the transmission and receipt of data. The transceiver 230 may be a wireless transceiver using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 230 can include any wireless technology developed in the future. Again, the one or more transceivers 230 can be any suitable combination of transceivers, including any combination of the transceivers noted above.

The vehicle 200 can include a positioning system 240. The positioning system 240 can include one or more mechanisms, devices, elements, components, systems, applications and/or combinations thereof, now known or later developed, configured to determine the geographic location of the vehicle 200. The positioning system 240 can include one or more mapping applications and/or have access to map data.

The positioning system 240 can include a global positioning system, a local positioning system or a geolocation system. The positioning system 240 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the positioning system 240 can use Transmission Control Protocol (TCP) and/or a Geographic information system (GIS) and location services.

The positioning system 240 may include a transceiver configured to estimate a position of the vehicle 200 with respect to the Earth. For example, the positioning system 240 can include a GPS transceiver to determine the vehicle's latitude, longitude and/or altitude. The positioning system 240 can use other systems (e.g. laser-based localization systems, inertial-aided GPS, and/or camera-based localization) to determine the location of the vehicle 200.

Alternatively or in addition, the positioning system 240 can be based on access point geolocation services, such as using the W3C Geolocation Application Programming Interface (API). With such a system, the location of the vehicle 200 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 200 is determined will depend on the manner of operation of the particular location system used.

The vehicle 200 can include an input system 250. An "input system" is defined as any device, component, system, element or arrangement or groups thereof that enable information/data to be entered into a machine. The input system 250 can receive an input from a vehicle occupant (e.g. a driver or a passenger). Any suitable input system 250 can be used, including, for example, a keypad, display, touch screen, multi-touch screen, button, joystick, mouse, trackball, microphone and/or combinations thereof.

The vehicle 200 can include an output system 260. An "output system" is defined as any device, component, system, element or arrangement or groups thereof that enable information/data to be presented. The output system 260 can present information/data to a vehicle occupant. For instance, the output system 260 can include a display, a microphone, earphone, and/or speaker. Some components of the vehicle 200 may serve as both a component of the input system 250 and a component of the output system 260.

The vehicle 200 can include a signaling system 270. A "signaling system" is defined as any one or more mechanisms, devices, elements, components, systems, and/or combinations thereof, now known or later developed, configured to present a signal on the exterior of a vehicle. The signaling system 270 can present a signal to one or more persons or entities located outside of a vehicle. For instance, the signaling system 270 can present a signal regarding the vehicle's presence, position, location, and/or a driver's intentions regarding future driving maneuvers.

The signaling system 270 can present a signal in any suitable form, such as an audial signal and/or a visual signal. An "audial signal" is any output that provides information in a manner that is perceptible to the human sense of hearing. For instance, the signaling system 270 can provide an audial signal by activating a horn of the vehicle 200. "Visual alert" is any output that provides information in a manner that is perceptible to the human sense of sight. For instance, the signaling system 270 can provide a visual signal by activating one or more headlights, one or more taillights, one or more brake lights, one or more hazard lights, one or more turn signal lights, and/or one or more lights located on the exterior of the vehicle 200.

In one or more arrangements, the vehicle 200 can include the location signaling module 120 or at least a portion of the location signaling module 120. The location signaling module 120 can include instructions (e.g., program logic) executable by one or more of the processors 210. Such instructions can include instructions to execute various vehicle functions and/or to transmit data to, receive data from, interact with, and/or control the vehicle or one or more systems thereof (e.g., the positioning system 240 and/or the signaling system 270). Such instructions can include instructions to activate, deactivate or alter a location signaling mode. Alternatively or in addition, one or more of the data stores 220 may contain instructions.

Figure 3:
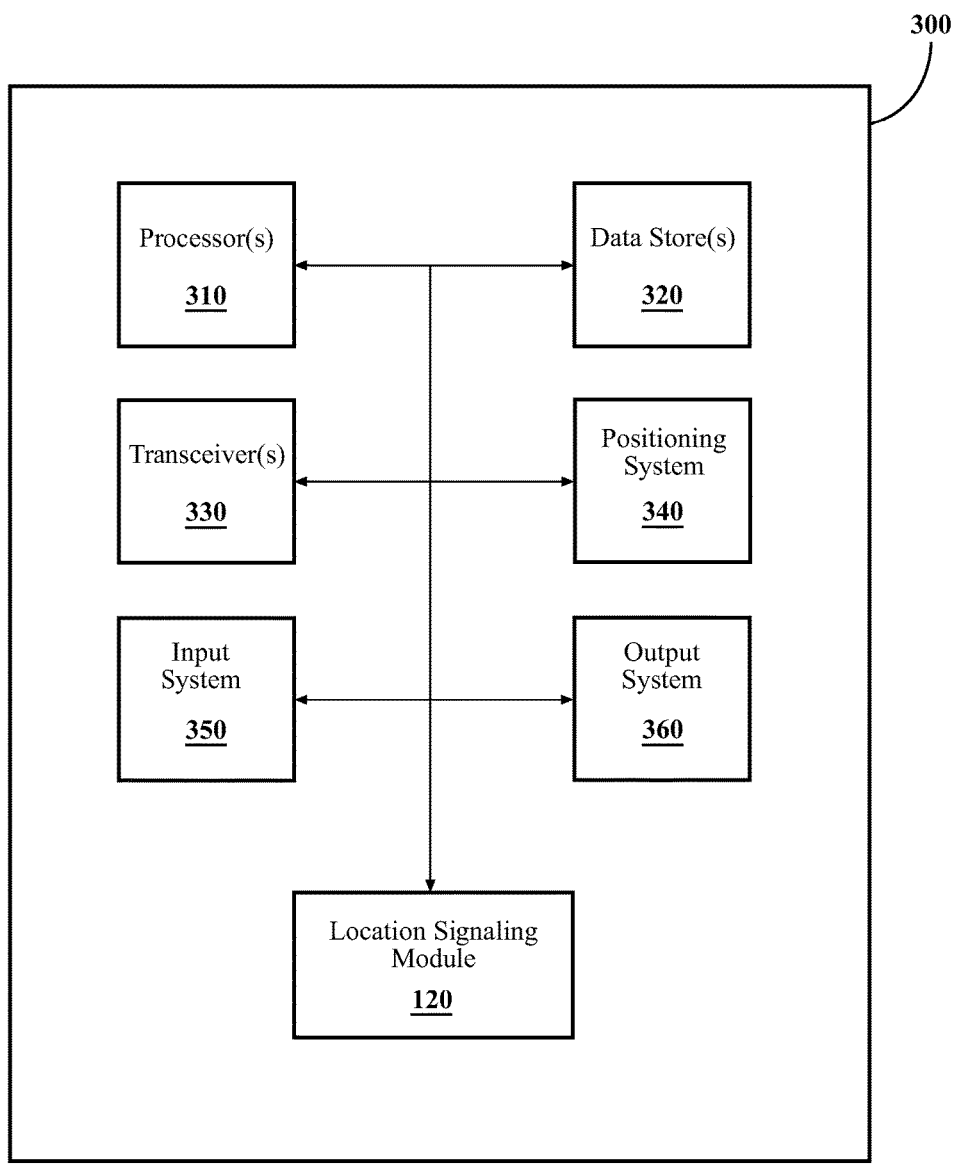
FIG. 3 is an example of a portable communication device configured for proximity-based location alerts.

Referring to FIG. 3, an example of the portable communication device 300 is shown. Some of the possible elements of the portable communication device 300 are shown in FIG. 3 and will now be described. It will be understood that it is not necessary for the portable communication device 300 to have all of the elements shown in FIG. 3 or described herein. The portable communication device 300 can have any combination of the various elements shown in FIG. 2. Further, the portable communication device 300 can have additional elements to those shown in FIG. 3. In some arrangements, portable communication device 300 may not include one or more of the elements shown in FIG. 3.

The portable communication device 300 can include one or more processors 310, one or more data stores 320, one or more transceivers 330, a positioning system 340, an input system 350 and/or an output system 360. The above description of the one or more processors 210, one or more data stores 220, one or more transceivers 230, the positioning system 240, the input system 250 and the output system 260 made in connection with the vehicle 200 applies equally to the one or more processors 310, one or more data stores 320, one or more transceivers 330, the positioning system 340, the input system 350 and the output system 360, respectively, of the portable communication device 300.

In one or more arrangements, the portable communication device 300 can include the location signaling module 120 or at least a portion of the location signaling module 120. The location signaling module 120 can include instructions (e.g., program logic) executable by one or more of the processors 310. Such instructions can include instructions to execute various portable communication device functions and/or to transmit data to, receive data from, interact with, and/or control the vehicle 200, one or more systems thereof (e.g., the positioning system 240 and/or the signaling system 270), and/or the portable communication device 300. Such instructions can enable the portable communication device 300 to communicate with the vehicle 200 through the communication network 110. Such instructions can include instructions to activate, deactivate or alter a location signaling mode. Alternatively or in addition, one or more of the data stores 320 may contain instructions.

The vehicle 200 can include a location signaling mode in which the vehicle 200 provides one or more alerts responsive to detecting an authorized portable communication device 300 is located within a predetermined alert distance from the vehicle 200. In one or more arrangements, the vehicle 200 can automatically provide one or more alerts responsive to detecting that an authorized portable communication device 300 is located within a predetermined alert distance from the vehicle 200. In this way, an indication of the location of the vehicle 200 can be provided to a user of the portable communication device 300 when the portable communication device 300 is located within a predetermined alert distance from the vehicle 200.

The predetermined alert distance can be any suitable distance. Further, the one or more alerts can include one or more visual alerts, one or more audial alerts, and/or one or more other type of alert detectable by one or more human senses. The one or more alerts can be generated automatically. The one or more alerts can be output continuously, periodically at any suitable interval, irregularly, or even randomly.

The location signaling mode can be activated at any suitable time. In one or more arrangements, the location signaling mode can be activated when the vehicle ignition is deactivated. In one or more arrangements, the location signaling mode can be activated when the vehicle transmission system is placed into park. In one or more arrangements, the location signaling mode can be activated when an authorized portable communication device 300 is no longer located within a predetermined alert distance from the vehicle 200 or if an authorized portable communication device 300 is no longer detected by the vehicle 200.

Once it is activated, the location signaling mode can be deactivated, discontinued, and/or disabled at any suitable time. For instance, the location signaling mode can be deactivated, discontinued, and/or disabled upon the occurrence of a predetermined event. For instance, the predetermined event can be the portable communication device 300 being located within a predetermined alert deactivation distance from the vehicle 200. The predetermined alert deactivation distance is less than the predetermined alert distance. Alternatively or in addition, the predetermined event can be a predetermined period of time. Alternatively or in addition, the predetermined event can be engaging a component of the vehicle 200, such as a door, a steering wheel, and/or a brake pedal, just to name a few possibilities. Such engagement can be detected by any suitable sensor(s). Alternatively or in addition, the predetermined event can be the unlocking of one or more doors of the vehicle 200. Alternatively or in addition, the predetermined event can be the activation of a vehicle system, such as the ignition system. Alternatively on in addition, the predetermined event can be a user command sent via the portable communication device 300.

According to arrangements described herein, the location signaling mode can be altered, as will be described below, if it is determined that the vehicle 200 is located in a predetermined special location. A special location can be determined by the user or other entity. The user can input a predetermined set of special locations. The set of special locations can include at least one special location. A "special location" is defined as any area, space, environment or structure in which concerns about locating a vehicle are reduced. Examples of places that may be defined as a special location include a user's home, a user's office, the home of a user's friend, the home of a user's family member, and/or places in which the user has a reserved or designed parking spot.

The special location can be defined in any suitable manner. As an example, a special location can be defined by a geographic location, a specified radius about a geographic location or an area defined by geographic boundaries. The geographic location and/or geographic boundaries can be defined in any suitable manner. For instance, the geographic location and/or geographic boundaries can be defined by any suitable coordinate system, an intersection, one or more streets, a landmark, or other suitable location or boundaries. The geographic location can include a specific point and a zone about at least a portion of the point.

The user can manually input one or more geographic coordinates into the vehicle 200 and/or the portable communication device 300 to be considered as being special locations. Alternatively or in addition, any time that a user parks the vehicle 200, the user can be prompted as to whether he or she wishes to add the current geographic coordinates as a special location. In one or more arrangements, if a user adds the current geographic coordinates as a special location, a zone can be automatically associated with the current geographic coordinates, or a user can selectively input a zone for association with the current geographic coordinates. The zone can be a predetermined zone, or the zone can be configured by a user. In one or more arrangements, the zone can be a radius about the current geographic coordinates of the vehicle 200. It will be appreciated that the zone can allow flexibility for a user to park in other nearby places while still being considered a special location. The user can input the special location and/or zone in any suitable manner, including by using the input system 250 of the vehicle 200 and/or by using the input system 350 of the portable communication device 300.

In one embodiment, the special location can be defined by a specific network or a specific wireless access point (WAP). Thus, the special locations can be a set of one or more networks and/or wireless access points. The term "network" is defined as one or more components designed to transmit or receive information to or from one source to another and includes networks that are centrally coordinated or those operating in a peer-to-peer fashion. The transmission can be achieved in any suitable manner, such as by a hardwire connection or wirelessly. "Wireless access point" means any device that allows a portable communication device to wirelessly connect to a network.

The user can configure the vehicle 200 and/or the portable communication device 300 so that one or more specific networks and/or one or more specific WAPs are identified as special locations. The special networks or WAPs can be identified and/or inputted by the user in any suitable manner. For instance, the user can manually identify one or more networks and/or WAPs that are to be considered special locations. Alternatively or in addition, any time the user connects to a network or WAP, the vehicle 200 and/or the portable communication device 300 can prompt the user as to whether he or she wishes to add this network or WAP as a special location. The user can identify the networks or WAPs using the input system 250 of the vehicle 200 and/or the input system 350 of the portable communication device 300.

There are still other possible ways to identify and/or specify a special location that is a network and/or WAP. For a wired or a wireless network, the Media Access Control (MAC) address of the gateway or router can be used. Alternatively, a server on a well-known address within a local area network (LAN) can be contacted. Still alternatively, a service discovery protocol, such as zero configuration networking (Zeroconf) or Bonjour available from Apple Inc., can be used to locate an authentication service on a local area network (LAN). Furthermore, within a wireless network, the service set identifier (SSID) of a network can be used. For greater security, the basic service set identifier (BSSID) of the access point can be used. For non IEEE 802.11-based wireless networks, the equivalent of the network controller's MAC address can be used.

Again, the above arrangements are merely examples of various ways in which the special location can be defined. Arrangements are not limited to these examples, as there can be other ways of defining a special location.

Now that the system 100, the vehicle 200, the portable communication device 300 and the location signaling mode have been described, various methods of the operation of the system 100 will now be described. Referring now to FIG. 4, an example of a method 400 for providing proximity-based location alerts for a vehicle is shown. Various possible steps of method 400 will now be described. The method 400 illustrated in FIG. 4 may be applicable to the embodiments described above in relation to FIGS. 1-3, but it is understood that the method 400 can be carried out with other suitable systems and arrangements. Moreover, the method 400 may include other steps that are not shown here, and in fact, the method 400 is not limited to including every step shown in FIG. 4. The steps that are illustrated here as part of the method 400 are not limited to this particular chronological order. Indeed, some of the steps may be performed in a different order than what is shown and/or at least some of the steps shown can occur simultaneously.

Again, the method 400 relates to the vehicle 200. The vehicle 200 can include a location signaling mode in which an alert can be automatically provided responsive to detecting the portable communication device 300 being located within a predetermined alert distance from the vehicle 200. Thus, an indication of the location of the vehicle 200 can be provided to a user of the portable communication device 300. The alert can be at least one of an audial alert and a visual alert.

At block 410, it can be determined whether the vehicle is located in a predetermined special location. Such a determination can be performed in any suitable manner. For instance, the determination can be performed by the positioning system 340, the location signaling module 120, and/or one or more processors 310. The method 400 can continue to block 420.

At block 420, it can be determined whether the vehicle 200 is located in a predetermined special location. In response to determining that the vehicle 200 is located in a predetermined special location, the location signaling mode can be altered. Any suitable altering of the location signaling mode can be implemented. As an example, altering the location signaling mode can include deactivating the location signaling mode. In such case, an alert will not be provided when the portable communication device 300 is detected as being located within a predetermined alert distance from the vehicle 200.

Alternatively, altering the location signaling mode can include changing a parameter associated with the location signaling mode. One example of such a parameter is the duration and/or frequency of an alert. For example, if an alert is provided at a frequency of about every 2 seconds in the location signaling mode, the frequency can be increased to a predetermined amount, such as to about every 10 seconds, in the altered location signaling mode. In such case, an alert will be provided when the portable communication device 300 is detected as being located within a predetermined alert distance from the vehicle 200, but such alert will be provided at the altered frequency.

When the alert is a visual alert (e.g., flashing one or more of the vehicle lights), the brightness of the lights can be another example of a parameter that can be altered. For instance, in the altered location signaling mode, the brightness of the lights can be decreased. In such case, when the portable communication device 300 is detected as being located within a predetermined alert distance from the vehicle 200, the vehicle 200 can provide a visual alert at a reduced brightness. When the alert is an audial alert (e.g., honking of the vehicle horn), the sound level of the horn can be altered. For example, in the altered location signaling mode, the sound level of the horn can be decreased from the sound level used in the location signaling mode. In such case, when the portable communication device 300 is detected as being located within a predetermined alert distance from the vehicle 200, the vehicle 200 can provide an audial alert at a reduced sound level.

Alternatively or in addition, altering the location signaling mode can include performing one or more actions. One example of such an action is unlocking one or more doors of the vehicle 200. Thus, in the altered location signaling mode, one or more doors of the vehicle 200 can be automatically unlocked when the portable communication device 300 is detected as being located within a predetermined alert distance from the vehicle 200.

The location signaling mode can remain in an altered condition for any suitable period of time or until a predetermined event occurs. For instance, the location signaling mode can remain in the altered condition until the vehicle is determined to be located in a non-special location. As another example, the location signaling mode can remain in the altered condition until a predetermined amount of time elapses. As a further example, the location signaling mode can remain in the altered condition until a user indicates otherwise.

The method 400 can end. Alternatively, the method 400 can return to block 410. As a further alternative, the method 400 can include additional and/or alternative blocks (not shown).

One non-limiting example of the operation of the vehicle 200 in accordance with the method 400 will now be described. The vehicle 200 and/or the portable communication device 300 can be configured so that the special locations are defined by a set of one or more geographic locations. When it is determined that the vehicle 200 is not located in a special location, the location signaling mode of the vehicle 200 can be activated, enabled or remain activated. When it is determined that the vehicle 200 is located in a special location, the location signaling mode of the vehicle 200 can be altered. For purposes of this example, the location signaling mode of the vehicle 200 can be altered by deactivating the locating signaling mode. For purposes of this example, the special location can be defined by geographic coordinates and/or a zone about at least a portion of the geographic coordinates. For purposes of this example, the set of special locations can include the user's home.

A user may drive the vehicle 200 to an intended destination. For purposes of this example, the intended destination can be a shopping mall. The vehicle 200 can determine its current location using the positioning system 240. Such a determination can be made at any suitable time, such as when the vehicle 200 is parked and/or when the ignition of the vehicle 200 is turned off.

The vehicle 200 can compare the determined current location to the set of special locations, as previously defined by the user. If the current location of the vehicle 200, as determined by the positioning system 240, is not included in the predetermined set of special locations, then the current location of the vehicle 200 is determined to be a non-special location. In response, the location signaling mode of the vehicle 200 can be activated.

The user may exit the vehicle 200 and enter the mall. The user may take his or her portable communication device 300 into the mall. In some instances, the user may wear the portable communication device 300 into the mall, such as when the portable communication device 300 is a smart watch. While the location signaling mode is activated, the vehicle 200 can sense the external environment of the vehicle 200 to detect one or more portable communication device 300. The sensing of the external environment of the vehicle 200 can be performed continuously, periodically at any suitable interval, irregularly, or even randomly.

When the user leaves the mall, the user can be carrying or wearing the portable communication device 300. If the portable communication device 300 is detected, the vehicle 200 can verify whether the detected portable communication device 300 is an authorized portable communication device. Any suitable manner of verification can be implemented. For instance, the vehicle 200 can require one or more forms of authentication credentials to be provided. The authentication credentials can include, for example, one or more passwords, one or more pass codes, one or more personal identification numbers (PINs), one or more unique identifiers, and combinations thereof, just to name a few possibilities. The authentication credentials can, in some instances, be stored on the portable communication device 300, such as on one or more of the data stores 320.

The authentication credentials can be provided automatically by the portable communication device 300. Alternatively or in addition, the vehicle 200 can query the portable communication device 300 to provide the authentication credentials. If suitable authentication is provided, communication between the portable communication device 300 and the vehicle 200 can continue. However, if suitable authentication is not provided, the vehicle 200 can be configured to ignore or filter the portable communication device 300.

The distance between the vehicle 200 and the portable communication device 300 can be determined. Such determination can be performed in any suitable manner. For instance, in one or more arrangements, the vehicle 200 can include a sensor system (not shown) that can detect the distance between the vehicle 200 and the portable communication device 300. In one or more arrangements, location data from the positioning system 240 of the vehicle 200 and location data from the positioning system 340 of the portable communication device 300 can be processed in any suitable manner to determine the distance between the vehicle 200 and the portable communication device 300.

In one or more arrangements, the distance between the vehicle 200 and the portable communication device 300 can be determined from and/or estimated based at least in part on the strength of the wireless communication signals between the vehicle 200 and the portable communication device 300. The signal strength can be inversely related to distance. Thus, the lesser the distance between the vehicle 200 and the portable communication device 300, the greater the signal strength; the greater the distance between the vehicle 200 and the portable communication device 300, the lesser the signal strength. The signal strength can be expressed in any suitable manner. For instance, the signal strength can be expressed as a value in any suitable units. Alternatively, the signal strength can be expressed as a set of bars or other graphical indicators showing the approximate signal strength. For instance, there can be a set of five bars, if all five bars are illuminated, maximum signal strength or near maximum signal strength (e.g., within about 20% or other percentage of the maximum signal strength) is obtained. Fewer than all five bars can be illuminated based on the percentage deviation from the maximum signal strength. As an example, four out of five bars can indicate a signal strength of about 60% to about 80% of the maximum signal strength, three out of five bars can indicate a signal strength of about 40% to about 60% of the maximum signal strength, two out of five bars can indicate a signal strength of about 20% to about 40% of the maximum signal strength, and one out of five bars can indicate a signal strength of less than about 20%.

In one or more arrangements, if the wireless communication signals between the vehicle 200 and the portable communication device 300 are at full strength, then the distance between the vehicle 200 and the portable communication device 300 can be determined to be located within a first distance range. If the wireless communication signals between the vehicle 200 and the portable communication device 300 are at less than full strength, then the distance between the vehicle 200 and the portable communication device 300 can be determined to be located at a farther distance or a within a farther distance range than the first distance range. In one or more arrangements, there can be predetermined distances or predetermined distance ranges associated with various signal strengths. For instance, at full signal strength, it can be presumed that the portable communication device 300 is located within a first predetermined distance from the vehicle 200. The first predetermined distance can be any suitable value, such as about 100 feet or less, about 90 feet or less, about 80 feet or less, about 70 feet or less, about 60 feet or less, or about 50 feet or less, just to name a few possibilities.

The determined distance between the vehicle 200 and the portable communication device 300 can be compared to a predetermined alert distance. The predetermined alert distance can be set by a user or some other entity. In one or more arrangements, the predetermined alert distance can be a single value. In one or more arrangements, the predetermined alert distance can be a range of values. In one or more arrangements, the predetermined alert distance can be expressed as signal strength or a distance associated with a signal strength. For instance, the predetermined alert distance can be a signal strength of at least about 30%, at least about 35%, at least about 40%, at least about 45%, at least about 45%, at least about 50%, at least about 55%, at least about 60%, at least about 65%, at least about 70%, at least about 75%, at least about 80%, at least about 85%, at least about 90%, or at least about 95% of a predetermined maximum signal strength.

If the determined distance is greater than the predetermined alert distance, no signal is provided by the vehicle 200. However, if the determined distance is less than the predetermined alert distance, the vehicle 200 can be configured to automatically provide one or more alerts. The alerts can be an audial alert and/or a visual alert. For instance, the visual alert can be the periodic flashing of one or more of the vehicle lights. The audial alert can be the honking of the vehicle horn. If the determined distance is equal to the predetermined alert distance, then the vehicle 200 can be configured to automatically provide one or more alerts or, alternatively, no alerts are provided by the vehicle 200.

In one or more arrangements, the portable communication device 300 can be configured to provide an alert, which can be in addition to the one or more alerts provided by the vehicle 200. The one or more alerts can be an audial alert and/or a visual alert. For instance, the visual alert can be a message presented on the output system 360 (e.g., a display) of the portable communication device 300. An audial alert may be a message output by the output system 360 (e.g., a speaker) of the portable communication device 300. The message can have any suitable content. For instance, the message may inform the user that the vehicle's lights are flashing. Alternatively or in addition, the message can include information about the location of the vehicle 200 relative to the user.

The above alerts can facilitate a user in locating his or her vehicle 200 in the parking lot. Such alerts can be helpful in large parking lots or when the user has forgotten where he or she parked the vehicle 200. Further, arrangements described herein can be beneficial because there is no need for manual user inputs to activate the alerts. Thus, a user does not need to fumble for a key or other device, which may be difficult in some circumstances such as when the user is carrying one or more objects (e.g., a child, one or more bags, one or more boxes, etc.).

The alerts can be provided by the vehicle 200 and/or the portable communication device 300 continuously, at any suitable interval, irregularly, or even randomly. The alerts can continue to be provided until any suitable point. For instance, the alerts provided by the vehicle 200 and/or the portable communication device 300 can continue until the portable communication device 300 is no longer located within the predetermined alert distance. Alternatively or in addition, the alerts provided by the vehicle 200 and/or the portable communication device 300 can continue until the portable communication device 300 is located within the predetermined alert deactivation distance. The predetermined alert deactivation distance is less than the predetermined alert distance. Alternatively or in addition, the alerts provided by the vehicle 200 and/or the portable communication device 300 can continue until a user input is received to discontinue the alerts. Alternatively or in addition, the alerts provided by the vehicle 200 and/or the portable communication device 300 can continue until one or more of the vehicle's door is unlocked.

The user may drive the vehicle 200 to another location. For purposes of this example, the user may drive the vehicle 200 to his or her home. The vehicle 200 can determine its current location using the positioning system 240. The vehicle 200 can compare the determined current location to the predetermined set of special locations. Here, the current location of the vehicle 200, as determined by the positioning system 240, is included in the predetermined set of special locations, as the user previously defined his or her home as a special location. As a result, the location signaling mode of the vehicle 200 can be altered. Again, for purposes of this example, the altered location signaling mode means that the location signaling mode is deactivated.

The user may exit the vehicle 200 and enter his or her home. The user may carry, wear or otherwise take the portable communication device 300 into his or her home. While the altered location signaling mode is activated, the vehicle 200 may continue to sense the external environment of the vehicle 200 to detect one or more authorized portable communication device 300. However, in some arrangements, the vehicle 200 may not sense the external environment.

When the user leaves his or her home, the user can be carrying or wearing the portable communication device 300. If the portable communication device 300 is detected, the vehicle 200 can verify whether the detected portable communication device 300 is an authorized portable communication device. If suitable authentication is provided, communication between the portable communication device 300 and the vehicle 200 can continue. The distance between the vehicle 200 and the portable communication device 300 can be determined. However, if the determined distance is less than the predetermined alert distance, the vehicle 200 can be configured to operate in the altered location signaling mode. Here, no alert will be presented by the vehicle 200 because the location signaling mode is deactivated.

In one or more arrangements, the portable communication device 300 can be configured so that it does not provide an alert in the altered location signaling mode. Alternatively, the portable communication device 300 can present a message indicating that the location signaling mode is deactivated.

The altered location signaling mode can be beneficial in that the user probably already knows where his or her vehicle 200 is located. Thus, it will be appreciated that the user's annoyance and frustration can be reduced because the vehicle 200 will not provide the alerts or may provide them in a less conspicuous way.

The altered location signaling mode can be continued until any suitable point. For instance, if the vehicle 200 is subsequently moved to a non-special location, then the altered location signaling mode can be discontinued and the standard settings for the location signaling mode can be restored.

Again, while the above example is directed to the special location being defined by a geographic location, it will be understood that arrangements are not limited in this respect. Indeed, in one or more arrangements, the special location can be defined by one or more networks and/or WAPs. In such case, the vehicle 200 can detect whether it is operatively connected to a network and/or a WAP. The vehicle 200 can determine whether the detected network and/or WAP is included in the set of special locations, that is, whether it is connected to a special network and/or WAP. The vehicle 200 can compare the detected network and/or WAP identified to the predetermined set of special networks or WAPs, as previously identified by the user or some other suitable entity. If the detected network or WAP identified is not included in the predetermined set of special networks or WAPs, then the detected network or WAP identified is determined to be a non-special location. As a result, the location signaling mode can be activated or maintained. If the detected network and/or WAP is included in the predetermined set of special networks or WAPs, then the network or WAP is determined to be a special location. As a result, the vehicle 200 can alter the location signaling mode.

In one or more arrangements, the special location can be defined by a specific signal. In such case, the vehicle 200 can consider itself to be in a special location as long as it receives a predetermined signal from a source, such as a beacon, transponder, NFC source or other suitable signal source. The vehicle 200 may detect such signals if it is located within a certain distance of the source. Such signals may be sent from the sources continuously, periodically or even randomly. If the signal received is not included in the set of predetermined signals, then the vehicle 200 can be determined to be in a non-special location. As a result, the location signaling mode can be activated or maintained. However, if the signal received is included in the set of predetermined signals, then the vehicle 200 can be determined to be in a special location. As a result, the vehicle 200 can alter the location signaling mode.

In one or more arrangements, the vehicle 200 can be configured to emit signals from a transmitter. The signals can be transmitted continuously, periodically or randomly. In this way, the vehicle 200 can act as a beacon. The vehicle 200 may, in some cases, receive a response to its signal from a transponder or other source. Such responsive signals may be generated if the vehicle 200 is sufficiently proximate to a transponder. If a responsive signal is received, then the vehicle 200 can determine whether it is located in a special location based on the received signal.

In one or more arrangements, the special location can be defined by a direct setting by the user. If the user has not indicated that the vehicle 200 is in a special location, then the location signaling mode can be activated or maintained. If the user has indicated that the device is in a special location, then the vehicle 200 can alter the location signaling mode.

In one or more arrangements, the vehicle 200 can be configured such that the set of special locations can be learned by the vehicle 200. For example, the vehicle 200 may be in a non-special location by default, as the user has not predefined the present location (as defined by a network, WAP, parameter, geographic location, etc.) as being a special location. Accordingly, the location signaling mode would be activated. However, the user may be prompted by the vehicle 200 and/or the portable communication device 300, such as being presented with a dialogue box, requesting user input on whether the current location should be considered a special location. If the user indicates that the present location is a special location, then the present location can be added to the set of special locations.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of locating a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the method including:
   determining whether the vehicle has entered a predetermined special location, the predetermined special location being previously-defined, wherein the vehicle is configured to alter the location signaling mode in a predetermined manner when the vehicle is determined to have entered the predetermined special location;
   each time that it is determined that the vehicle has entered the predetermined special location, prompting a user for approval to alter the location signaling mode, whereby the user can selectively determine whether the location signaling mode is maintained or altered;
   responsive to receiving a user input corresponding to approval to alter the location signaling mode, altering the location signaling mode in the predetermined manner associated with the predetermined special location; and
   responsive to receiving a user input corresponding to disapproval of altering the location signaling mode or responsive to not receiving a user input corresponding to approval to alter the location signaling mode, maintaining the location signaling mode.

2. A method of locating a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the method including:
   determining whether the vehicle is located in a predetermined special location, the predetermined special location being defined by a predetermined set of one or more networks, and wherein determining whether the vehicle is located in a predetermined special location includes:
      identifying a network to which at least one of the vehicle and the authorized portable communication device is connected; and
      comparing the identified network to the predetermined set of one or more networks, wherein, if the identified network is included in the predetermined set of one or more networks, then the vehicle is determined to be in located in a predetermined special location; and
   responsive to determining that the vehicle is located in a predetermined special location, altering the location signaling mode.

3. A method of locating a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the method including:
   determining whether the vehicle is located in a predetermined special location, the predetermined special location being defined by a predetermined set of one or more wireless access points, and wherein determining whether the vehicle is located in a predetermined special location includes:
      identifying a wireless access point to which at least one of the vehicle and the authorized portable communication device is operatively connected; and
      comparing the identified wireless access point to the predetermined set of one or more wireless access points, wherein, if the identified wireless access point is included in the predetermined set of one or more wireless access points, then the vehicle is determined to be in a special location; and
   responsive to determining that the vehicle is located in a predetermined special location, altering the location signaling mode.

4. The method of claim 3, wherein altering the location signaling mode includes disabling the location signaling mode, whereby an indication of the location of the vehicle is not provided responsive to detecting that the authorized portable communication device is located within the predetermined alert distance from the vehicle.

5. The method of claim 4, further including:
   responsive to detecting an authorized portable communication device being located within a predetermined alert distance from the vehicle, activating the altered location signaling mode.

6. The method of claim 4, further including:
responsive to determining that the vehicle is no longer located in a predetermined special location, restoring the location signaling mode.

7. The method of claim 3, wherein altering the location signaling mode is performed automatically.

8. A system for locating a vehicle comprising:
a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the vehicle including:
a processor configured to:
determine whether the vehicle has entered a predetermined special location, the predetermined special location being previously-defined, the processor being configured to alter the location signaling mode in a predetermined manner when the vehicle is determined to have entered the predetermined special location;
each time that it is determined that the vehicle has entered the predetermined special location, prompt a user for approval to alter the location signaling mode, whereby the user can selectively determine whether the location signaling mode is maintained or altered;
responsive to receiving a user input corresponding to approval to alter the location signaling mode, alter the location signaling mode in the predetermined manner associated with the predetermined special location; and
responsive to receiving a user input corresponding to disapproval of altering the location signaling mode or responsive to not receiving a user input corresponding to approval to alter the location signaling mode, maintain the location signaling mode.

9. A system for locating a vehicle comprising:
a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the vehicle including:
a processor configured to:
determine whether the vehicle is located in a predetermined special location, the predetermined special location being defined by a predetermined set of one or more networks, and wherein determining whether the vehicle is located in a predetermined special location includes:
identifying a network to which at least one of the vehicle and the authorized portable communication device is connected; and
comparing the identified network to the predetermined set of one or more networks, wherein, if the identified network is included in the predetermined set of one or more networks, then the vehicle is determined to be in located in a predetermined special location; and
responsive to determining that the vehicle is located in a predetermined special location, alter the location signaling mode.

10. The system of claim 9, wherein altering the location signaling mode includes disabling the location signaling mode, whereby an indication of the location of the vehicle is not provided responsive to detecting that the authorized portable communication device is located within the predetermined alert distance from the vehicle.

11. The system of claim 10, wherein the processor is further configured to:
responsive to detecting an authorized portable communication device being located within a predetermined alert distance from the vehicle, activating the altered location signaling mode.

12. The system of claim 10, wherein the processor is further configured to:
responsive to determining that the vehicle is no longer located in a predetermined special location, restoring the location signaling mode.

13. The system of claim 9, wherein altering the location signaling mode is performed automatically.

14. A system for locating a vehicle comprising:
a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the vehicle including:
a processor configured to:
determine whether the vehicle is located in a predetermined special location, the predetermined special location being defined by a predetermined set of one or more wireless access points, and wherein determining whether the vehicle is located in a predetermined special location includes:
identifying a wireless access point to which at least one of the vehicle and the authorized portable communication device is operatively connected; and
comparing the identified wireless access point to the predetermined set of one or more wireless access points, wherein, if the identified wireless access point is included in the predetermined set of one or more wireless access points, then the vehicle is determined to be in a special location; and
responsive to determining that the vehicle is located in a predetermined special location, alter the location signaling mode.

15. A method of locating a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the method including:
when the vehicle is placed in park or an ignition of the vehicle is deactivated, transmitting, using one or more transceivers onboard the vehicle, an initial signal to the external environment of the vehicle;
when one or more transceivers onboard the vehicle receive a signal from a source external to the vehicle generated in response to the initial signal transmitted to the external environment of the vehicle, determining whether the vehicle is located in a predetermined special location based on the received signal from the source external to the vehicle, the predetermined special location being defined by a set of one or more predetermined signals, the determining including:
  comparing the received signal from the source external to the vehicle to the set of one or more predetermined signals; and
  if the received signal from the source external to the vehicle is included in the set of one or more predetermined signals, then the vehicle is determined to be in located in a predetermined special location; and
responsive to determining that the vehicle is located in a predetermined special location, altering the location signaling mode, whereby nuisance alerts are avoided.

16. The method of claim 15, wherein the source external to the vehicle is one of a beacon, a transponder, or a near field communication (NFC) source.

17. A system for locating a vehicle comprising:
a vehicle, the vehicle including a location signaling mode in which at least one of an audial alert and a visual alert is automatically provided responsive to detecting an authorized portable communication device being located within a predetermined alert distance from the vehicle, whereby an indication of the location of the vehicle is provided to a user of the authorized portable communication device, the vehicle including:
  one or more transceivers, at least one of the one or more transceivers being configured to transmit an initial signal to the external environment of the vehicle when the vehicle is placed in park or an ignition of the vehicle is deactivated, at least one of the one or more transceivers being configured to receive signals from a source external to the vehicle generated in response to the initial signal transmitted to the external environment of the vehicle;
  a processor operatively connected to the one or more transceivers, the processor being configured to:
    responsive to one or more transceivers receiving a signal from a source external to the vehicle generated in response to the initial signal transmitted to the external environment by one or more transceivers, determine whether the vehicle is located in a predetermined special location based on the received signal, the predetermined special location being defined by a set of one or more predetermined signals, the determining including:
      comparing the received signal to the set of one or more predetermined signals; and
      if the received signal is included in the set of one or more predetermined signals, then the vehicle is determined to be located in a predetermined special location; and
    responsive to determining that the vehicle is located in a predetermined special location, alter the location signaling mode, whereby nuisance alerts are avoided.

18. The system of claim 17, wherein the source external to the vehicle is one of a beacon, a transponder, or a near field communication (NFC) source.

* * * * *